US012658098B2

(12) United States Patent
Imanishi et al.

(10) Patent No.: US 12,658,098 B2
(45) Date of Patent: Jun. 16, 2026

(54) DISPLAY DEVICE, INFORMATION PROCESSING SYSTEM, AND CONTROL METHOD

(71) Applicant: Lenovo (Singapore) Pte. Ltd., Singapore (SG)

(72) Inventors: Yoshimitsu Imanishi, Kyoto (JP); Mitsuhiro Yamazaki, Kanagawa (JP); Yoshitsugu Suzuki, Kanagawa (JP); Seiichi Kawano, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 139 days.

(21) Appl. No.: 18/606,298

(22) Filed: Mar. 15, 2024

(65) Prior Publication Data

US 2024/0339069 A1 Oct. 10, 2024

(30) Foreign Application Priority Data

Apr. 7, 2023 (JP) ................................ 2023-062806

(51) Int. Cl.
*G09G 3/34* (2006.01)
*G09G 3/20* (2006.01)

(52) U.S. Cl.
CPC ........... *G09G 3/2096* (2013.01); *G09G 3/344* (2013.01); *G09G 2320/0257* (2013.01); *G09G 2340/0435* (2013.01)

(58) Field of Classification Search
CPC ................. G09G 3/2096; G09G 3/344; G09G 2320/0257; G09G 2340/0435
See application file for complete search history.

(56) References Cited

U.S. PATENT DOCUMENTS

2014/0292830 A1* 10/2014 Harrington .......... G09G 3/2044 345/208
2016/0125813 A1 5/2016 Park
2016/0133196 A1* 5/2016 Emelie ................... G09G 3/344 345/107
2019/0156785 A1 5/2019 Marchya et al.
2019/0182452 A1* 6/2019 Choudha ............... G06F 3/0485

FOREIGN PATENT DOCUMENTS

JP 2004-101938 A 4/2004
JP 2012-159786 A 8/2012
JP 2012-194345 A 10/2012
(Continued)

OTHER PUBLICATIONS

Visionect (NPL)—“Why does an electronic paper display flicker?” —Apr. 4, 2023 (Year: 2023).*

*Primary Examiner* — Daniel F Hajnik
*Assistant Examiner* — Adeel Bash
(74) *Attorney, Agent, or Firm* — Osha Bergman Watanabe & Burton LLP

(57) ABSTRACT

A display device includes: a display medium having a screen area in which pixels are disposed at regular intervals; and a controller that causes the display medium to display an image. The controller is configured to perform refresh process on target pixels that are included in a different pixel pattern for each predetermined refresh cycle. The target pixels being of the pixels disposed in the screen area and being distributed at intervals wider than the regular intervals.

7 Claims, 6 Drawing Sheets

(56) References Cited

FOREIGN PATENT DOCUMENTS

| | | | |
|---|---|---|---|
| JP | 2014-182258 | A | 9/2014 |
| JP | 2015-41182 | A | 3/2015 |
| JP | 2015-64421 | A | 4/2015 |
| JP | 2015-158530 | A | 9/2015 |
| JP | 2019-144481 | A | 8/2019 |

* cited by examiner

DISPLAY DEVICE, INFORMATION PROCESSING SYSTEM, AND CONTROL METHOD

CROSS-REFERENCE TO RELATED APPLICATIONS

This application claims priority to Japanese Patent Application No. 2023-062806 filed on Apr. 7, 2023, the contents of which are hereby incorporated herein by reference in their entirety.

TECHNICAL FIELD

The present application relates to a display device, an information processing system, and a control method, including refresh process of a display.

BACKGROUND

Electro phoretic displays (EPDs) display various types of information with high contrast and without adjusting the light source. The display provides mild visual stimulation, and is often used to display mainly text-based information. For instance, Japanese Unexamined Patent Application Publication No. 2015-64421 describes its applications for e-book terminals, electronic medical records, and electronic newspapers. EPD is also called an electric paper display or electronic ink display, for example.

EPDs perform refresh process to avoid afterimages. Afterimages are also called ghost. The refresh process is to temporarily reset the brightness of each pixel to temporarily erase the display information, and then display an image again. The refresh process is also called rewrite process. Some information processing apparatuses equipped with EPDs have a refresh button. Pressing the refresh button executes the refresh process on the entire display screen as necessary.

The operation of executing the refresh process, however, is troublesome for users. If the operation is performed, the display of the entire screen is reset all at once due to the refresh process. This may give the user a discomfort feeling. The refresh process can be burdensome to users and reduce the usability.

SUMMARY

A display device according to one or more embodiments of the present application includes: a display medium having a screen area in which pixels are disposed at regular intervals; and a controller that causes the display medium to display an image. The controller is configured to perform refresh process on target pixels that are included in a different pixel pattern for each predetermined refresh cycle, and the target pixels are of the pixels disposed in the screen area and are distributed at intervals wider than the regular intervals.

In the display device, the controller may determine the target pixels from the pixels disposed in the screen area using pseudo random numbers.

In the display device, the controller may acquire binary information indicating a binarized signal value for each pixel at each refresh cycle, and may determine pixels for which binary information in a current refresh cycle varies from binary information in a previous refresh cycle as candidates for the target pixels.

In the display device, the controller may exclude target pixels in the previous refresh cycle from the candidates in the current refresh cycle.

In the display device, the refresh process may include inverting a value of the binary information.

In the display device, the controller may perform the refresh process more frequently to pixels in a surrounding area within a predetermined range from an edge area where pixels having a difference in signal value from adjacent pixels that is larger than a predetermined reference value are connected than to pixels outside the surrounding area.

In the display device, the display medium may include an electro phoretic display.

An information processing system according to one or more embodiments of the present application includes: a host system that provides the controller with display data indicating a signal value for each pixel; and the display device.

In the information processing system, the host system may determine the refresh cycle based on frequency of an input operation to the screen area.

A control method according to one or more embodiments of the present application controls a display device that includes a display medium having a screen area in which pixels are disposed at regular intervals, the method causing the display medium to display an image, the display device performing refresh process on target pixels that are included in a different pixel pattern for each predetermined refresh cycle, the target pixels being of the pixels disposed in the screen area and being distributed at intervals wider than the regular intervals.

The above-described embodiments of the present application improve the usability of a display device that needs refresh process.

DETAILED DESCRIPTION

Figure 1:
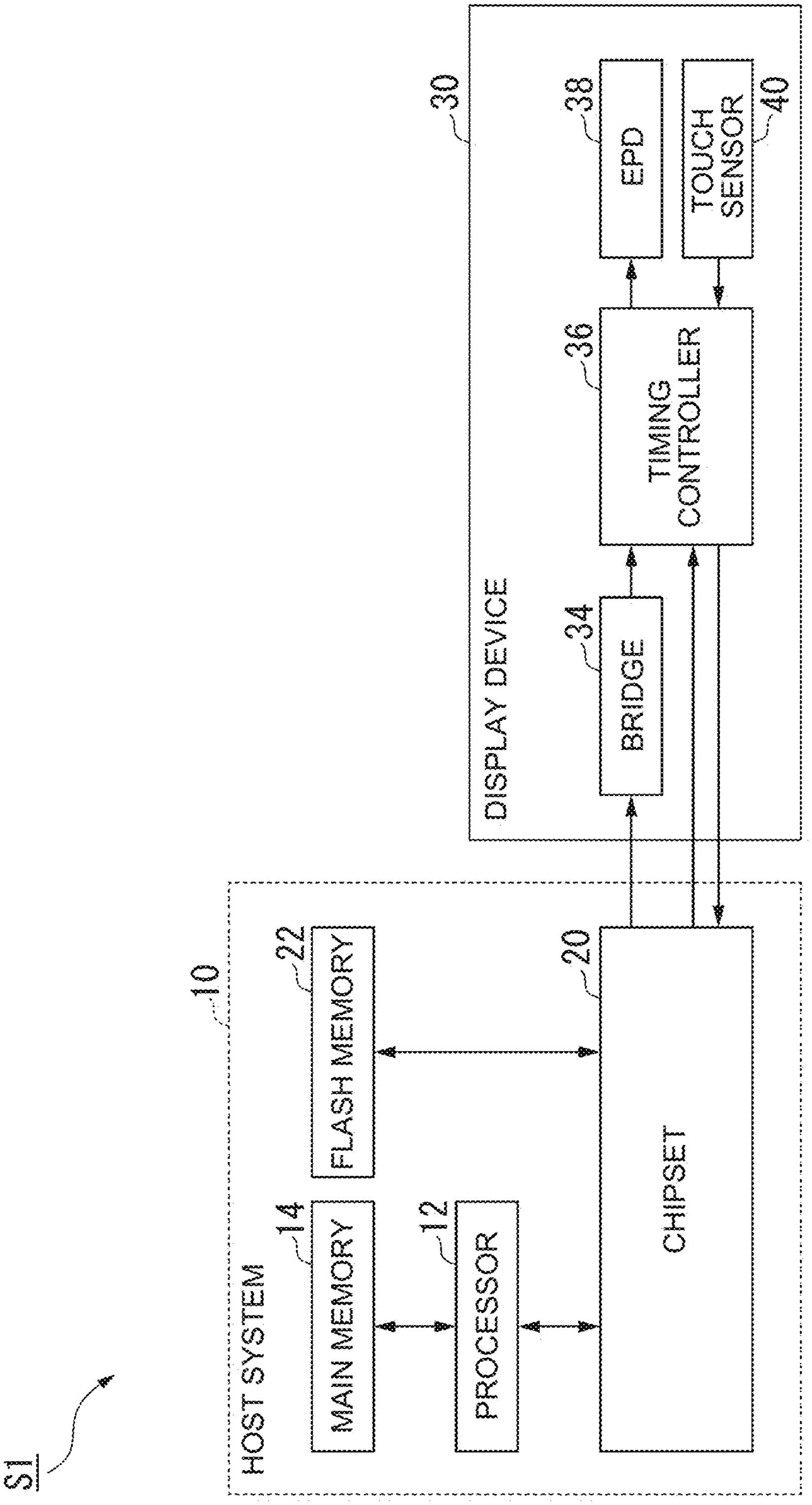
FIG. 1 is a block diagram schematically illustrating one example of the configuration of the information processing system according to one or more embodiments.

The following describes embodiments of the present application, with reference to the drawings. First, the following describes an example of the configuration of an information processing system S1 according to one embodiment of the present application. FIG. 1 is a block diagram schematically illustrating one example of the configuration of the information processing system S1 according to one or more embodiments.

The information processing system S1 includes a host system 10 and a display device 30.

The information processing system S1 can be embodied as an electronic apparatus having the host system 10 that is a main computer system. The information processing system S1 may be embodied as any form of information processing apparatus such as a personal computer, a tablet terminal, or a mobile phone. The host system 10 acquires display data indicating display information according to various programs, and outputs the acquired display data to the display device 30. The host system 10 receives input information from an input device and controls the operation based on the input information. The input information is generated in response to an input operation to the input device. FIG. 1 illustrates an example, where a touch sensor 40 of the display device 30 corresponds to an example of the input device.

The display device 30 displays an image on its screen area based on the display data input from the host system 10. In this application, an "image" means a spatial change in brightness or color, and refers to a pattern, figure, symbol, character, or a combination thereof. The display device 30 includes a display medium and a controller. The display medium has a screen area in which pixels are placed at regular intervals. The controller causes the display medium to display an image based on display data input from the host system 10. The controller performs refresh process to an image that constitutes a different pixel pattern at every predetermined refresh cycle. Each pixel pattern indicates an arrangement of pixels that are of the pixels placed in the screen area and are distributed at intervals wider than the intervals of the pixels placed in the screen area. A timing controller 36 and an electric phoretic display (EPD) 38 correspond to examples of the controller and the display medium, respectively.

As will be described later, the refresh process involves a temporary change in signal value for each pixel. In one or more embodiments, the refresh process is performed by changing a pixel pattern of some pixels located in the screen area of the EPD 38 at every predetermined refresh cycle. This reduces the impact on visual perception compared to when the refresh process is performed on the entire screen area at the same time.

Next, the following describes an example of the hardware configuration of the information processing system S1.

The host system 10 includes a processor 12, a main memory 14, a chipset 20, and a flash memory 22. The host system 10 controls the functions of the entire information processing system S1.

The processor 12 controls the functions of the entire apparatus including the host system 10. For instance, the processor 12 includes one or more central processing units (CPUS). The processor 12 executes a predetermined program and works with the main memory 14, chipset 20, flash memory 22, and some or all of the other hardware to perform the functions (described below) of the host system 10.

In this application, the execution of processing by the processor 12 or other hardware as instructed by a command written in a program may be referred to as "executing a program" or "execution of a program."

The main memory 14 is a writable memory used as a work area of the processor 12, that is, an area for reading an executed program and various configuration data, and an area for writing processing data acquired through the execution of a program. For instance, the main memory 14 includes a plurality of dynamic random access memory (DRAM) chips. Executed programs include an operating system (OS), various device drivers for controlling peripherals, various services/utilities, and application programs (they may be called "app" in this application).

The processor 12 and main memory 14 function as the minimal system device that serves as the host system 10. The host system 10 includes a system device as hardware, and software such as an OS and scheduled tasks.

The chipset 20 includes one or more controllers and is connectable to other devices, including the display device 30, for input/output of various data. The chipset 20 is also called a platform controller hub (PCH). For instance, the chipset 20 includes one or a combination of bus controllers, such as universal serial bus (USB), serial advanced technology attachment (ATA), serial peripheral interface (SPI) bus, peripheral component interconnect (PCI) bus, PCI-Express bus, and low pin count (LPC).

The flash memory 22 stores various programs and data. Various programs include firmware, device drivers, services/utilities, and apps. These programs are executed by the processor 12. The stored data includes data to be processed by the processor 12 and data generated by the processing. The generated data may include not only final data but also intermediate data used in steps subsequent to a certain step.

The display device 30 includes a bridge 34, a timing controller 36, an EPD 38, and a touch sensor 40.

The screen area of the EPD 38 overlaps with the detection area of the touch sensor 40 so that it covers almost the entire detection area.

When the format of the display data input from the host system 10 (hereinafter this may be called a "first format") differs from the format that the timing controller 36 can process (hereinafter this may be called a "second format"), the bridge 34 converts the format of the input display data from the first format to the second format. The bridge 34 outputs the display data of the converted format to the timing controller 36. For instance, the bridge 34 converts the display data compliant with the display (DP) standard or high-definition multimedia interface (HDMI) (registered trademark) standard into the display data compliant with the mobile industry processor interface (MIPI) standard (MIPI bridge).

The timing controller (T-CON) 36 receives display data from the host system 10 via the bridge 34. The timing controller 36 may receive display data according to the MIPI standard from the host system 10. The timing controller 36 then causes the EPD 38 to display an output screen based on the display data. The timing controller 36 includes a frame buffer that temporarily stores the display data.

Each time display data is input, the timing controller 36 updates (overwrites) the display data stored in the frame buffer with the newly input display data. The timing controller 36 performs refresh process at a predetermined refresh rate (this may be called a "refresh frequency" or "update frequency") and causes the EPD 38 to display an output image specified by the display data stored in the frame buffer. For instance, the refresh rate for the EPD 38 is 8 Hz. In one or more embodiments, the timing controller 36 performs refresh process on a different pixel pattern for each refresh cycle. The refresh cycle corresponds to the reciprocal of the refresh rate, that is, the time intervals at which refresh process is performed. A pixel pattern is a set of pixels that includes some of all the pixels placed on the EPD 38.

The timing controller 36 identifies the signal value for each pixel by referring to the display data stored in the frame buffer at that refresh rate, and generates an output signal to give an instruction for the timing to display with the brightness corresponding to the identified signal value. The timing controller 36 outputs the generated output signal to the drive circuit of the EPD 38. For instance, the drive circuit includes a transistor-transistor logic (TTL) circuit. In one or more embodiments, the refresh process includes a process of temporarily changing a signal value specified by the display data for target pixels to be processed to a predetermined reference value at a certain refresh cycle. For pixels whose signal values specified by the display data remain unchanged over a plurality of refresh cycles, their signal values are reset instead of the reference value.

The timing controller 36 monitors a detection signal input from the detection elements placed on the touch sensor 40, and specifies the coordinates where the detection element that detected the input operation is placed. The detection signal is transmitted according to the I2C standard, for example. The timing controller 36 outputs input information indicating the identified coordinates to the host system 10. The input information is transmitted according to a protocol specified by the USB standard, for example.

The timing controller 36 may include an existing arithmetic circuit such as an application specific integrated circuit (ASIC) as hardware, and execute a rewritable program to implement its functions, or may be implemented with dedicated hardware.

The EPD 38 has a shape that is much thinner than its height and width, and has the screen area on its surface. A plurality of pixels are two-dimensionally placed at regular intervals in the screen area. Each pixel includes an electro phoretic element and a pixel electrode. The EPD 38 includes a drive circuit that applies a drive voltage corresponding to a signal value specified for each pixel by the timing controller 36 to the pixel electrode of the pixel. Each electro phoretic element exhibits brightness in accordance with the driving voltage. An image that constitutes the display information is represented by the brightness distribution of the pixels placed in the screen area. On the EPD 38, the signal value corresponding to the driving voltage may be binarized, and a binary image representing either brightness or darkness (black and white) may be displayed for each pixel. That is, a binary image is expressed as binary information indicating either 1 or 0 that is a signal value for each pixel. In the refresh process by the timing controller 36, the value of binary information at a certain refresh cycle may be inverted, and the value of the binary information in the next refresh cycle may return to the original value of the binary information. The display control by the timing controller 36 will be described later.

The touch sensor 40 has a detection area to detect a position in contact with other objects. Other objects include a human finger, and a stylus pen. The touch sensor 40 is an example of the input device that accepts an input operation and gives input information according to the accepted input operation to the host system 10. The touch sensor 40 has a detection area, in which a plurality of detection elements are two-dimensionally placed at regular intervals. Each detection element detects a contact state with another object and outputs a detection signal indicating the detected contact state to the timing controller 36. The contact state detected includes presence or absence of a contact with another object due to an input operation to the detection area and the contact pressure. The touch sensor 40 may operate based on any detection principle, such as an electromagnetic resonance (EMR) method, an active electro-static (AES) method, or a resistive film method.

The host system 10 executes various programs to acquire display data indicating display information. The display information may be a moving image or a still image. A moving image includes different output images that are sequentially switched at a constant frame rate. For instance, the frame rate is 30 to 120 Hz. Each time the output image is switched, the host system 10 outputs display data indicating the switched output image to the display device 30.

For instance, the host system 10 executes an app to generate an output image that represents any one or a combination of characters, symbols, figures, patterns and others that indicate the results of various processes. The host system 10 may generate an output image including various information received from other devices. When obtaining display data, the host system 10 may refer to input information based on the detection information by the touch sensor 40. For the app image generated by the execution of an app, the host system 10 may generate an output image by superimposing a cursor on the coordinates specified by the input information (cursor display). The host system 10 may generate a locus of the coordinates specified by the input information obtained up to that point by executing an app, and generate an output image by superimposing a cursor on the generated locus and the latest coordinates (drawing display).

Figure 2:
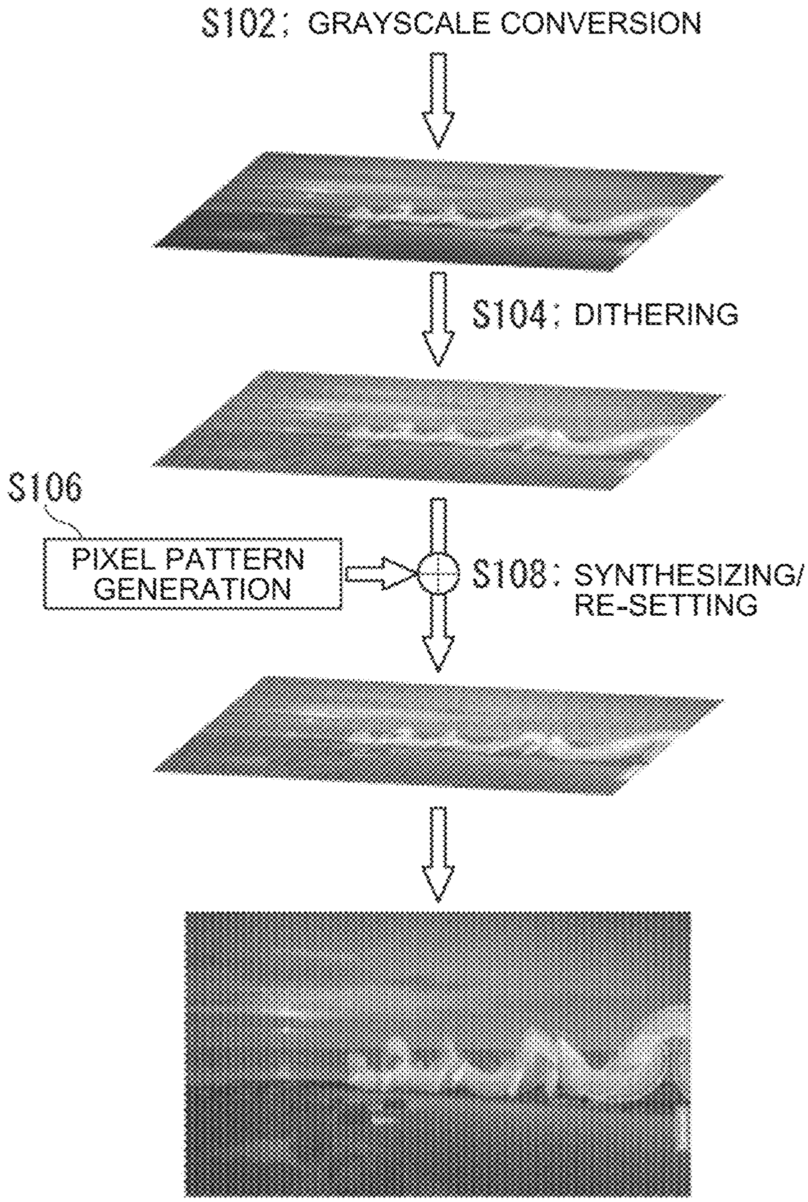
FIG. 2 is a flowchart illustrating an example of the display control according to one or more embodiments.

Next, the following describes an example of the display control according to one or more embodiments. FIG. 2 is a flowchart illustrating an example of the display control according to one or more embodiments. In the example of FIG. 2, it is assumed that the host system 10 acquires RGB signals as display data and causes the EPD 38 to display a binary image. The RGB signals can be a vector containing color signal values indicating the respective intensities of red (R), green (G), and blue (B) as elements.

(Step S102) The timing controller 36 performs known grayscale conversion to the signal value of each of the pixels forming the RGB signals, and converts it into a signal value (grayscale value) indicating brightness and darkness for each pixel. The grayscale conversion includes processing of calculating a weighted average value of a color signal value for each color as a grayscale value. The grayscale conversion converts a color image into a monochrome image having an intensity distribution for each pixel.

(Step S104) The timing controller 36 performs dithering to the grayscale value for each pixel to generate binary information (flags) indicating brightness or darkness. The dithering is an example of binarization. The dithering includes the following steps: (i) set a grayscale value as a determination threshold; (ii) generate random numbers (uniform random numbers) that have a range similar to the grayscale value and have a uniform probability of occurrence within that range; and (iii) if the generated random number is greater than or equal to the determination threshold, set the value of the binary information to 1, and if the generated random number is less than the determination threshold, set the value of the binary information to 0. A binary information value of 1 indicates that the pixel is displayed in white as a bright area, and a binary information value of 0 indicates that the pixel is displayed in black as a dark area. With this method, the brighter a portion of a monochrome image expressed in grayscale, the higher the probability that the bright portion will be specified by binary information. Thus, the degree and distribution of shading of a monochrome grayscale image is expressed by a binary image that has a distribution of binary information for each pixel. The timing controller 36 stores display data including binary information for each pixel in the frame buffer. With this process, the timing controller 36 allows the EPD 38 to display a binary image as the output image.

(Step S106) The timing controller 36 determines a set of some of the pixels in the EPD 38 as a pixel pattern. For instance, the timing controller 36 selects target pixels to be processed from among all the pixels that are candidates (hereinafter they may be called "candidate pixels") using a uniform random number at a predetermined update rate. For the timing controller 36, a real number of 0.5 or less is set in advance as the update rate, and the range of uniform random numbers is set in advance as equal to or greater than 0 to equal to or less than 1. The update rate corresponds to the ratio of target pixels to candidate pixels. The timing controller 36 repeats the process of generating a random number using a predetermined pseudo-random number generation method for each pixel of the EPD 38. The timing controller 36 determines a pixel for which the generated random number value is less than or equal to the set update rate as a target pixel, and determines a pixel for which the generated random number value exceeds the set update rate as a non-target pixel. The timing controller 36 generates a pixel pattern that includes binary information indicating whether each pixel is a target pixel or not. Whether the value of binary information in a pixel pattern is 1 or 0 indicates that the pixel is a target pixel or not.

(Step S108) The timing controller 36 performs refresh process for each target pixel specified by the generated pixel pattern. In the refresh process, the timing controller 36 temporarily inverts (synthesizes) the value of the binary information for the target pixels out of the binary information for each pixel representing the binary image. The inversion refers to changing one of two values to the other. For instance, 1 is changed to 0, or 0 is changed to 1. The timing controller 36 stores the binary information indicating the inverted value for the target pixels in the frame buffer.

The timing controller 36 then inverts the value of the inverted binary information for each target pixel and restores it to its original value (re-setting). The timing controller 36 stores the binary information indicating the inverted value for the target pixels in the frame buffer.

Thus, the timing controller 36 changes the bright/dark pattern for some randomly distributed pixels at each refresh cycle. The pattern of bright and dark cannot be predicted. This reduces the visual impact of the refresh process compared to when the refresh process is performed to all pixels at once. This therefore prevents or makes it difficult for the user to notice the execution of the refresh process.

Note that for a moving image in which the value of binary information changes every refresh cycle, the re-setting process in step S108 may be omitted. The value of the binary information is temporarily changed by the refresh process in one refresh cycle, and thereafter a new value of the binary information may be set in the next refresh cycle.

FIG. 2 illustrates an example of the process, where the candidate pixels that are candidates for the target pixels are all pixels of the EPD 38. The candidate pixels may be limited to some pixels of the EPD 38. For instance, the timing controller 36 may determine a candidate pixel that is a pixel whose binary information value in the current refresh cycle has changed from the binary information value in the previous refresh cycle. The current refresh cycle means the refresh cycle at that point in time, and the previous refresh cycle means the refresh cycle immediately before the current refresh cycle. This allows the refresh process to be concentrated on an area where an afterimage tends to be noticeable due to a change in value.

The timing controller 36 may exclude target pixels for which refresh process was performed in the previous refresh cycle from the candidate pixels in the current refresh cycle. This distributes the execution of the refresh process over time, and thus alleviates the impact of afterimages on the entire screen area.

Figure 3:
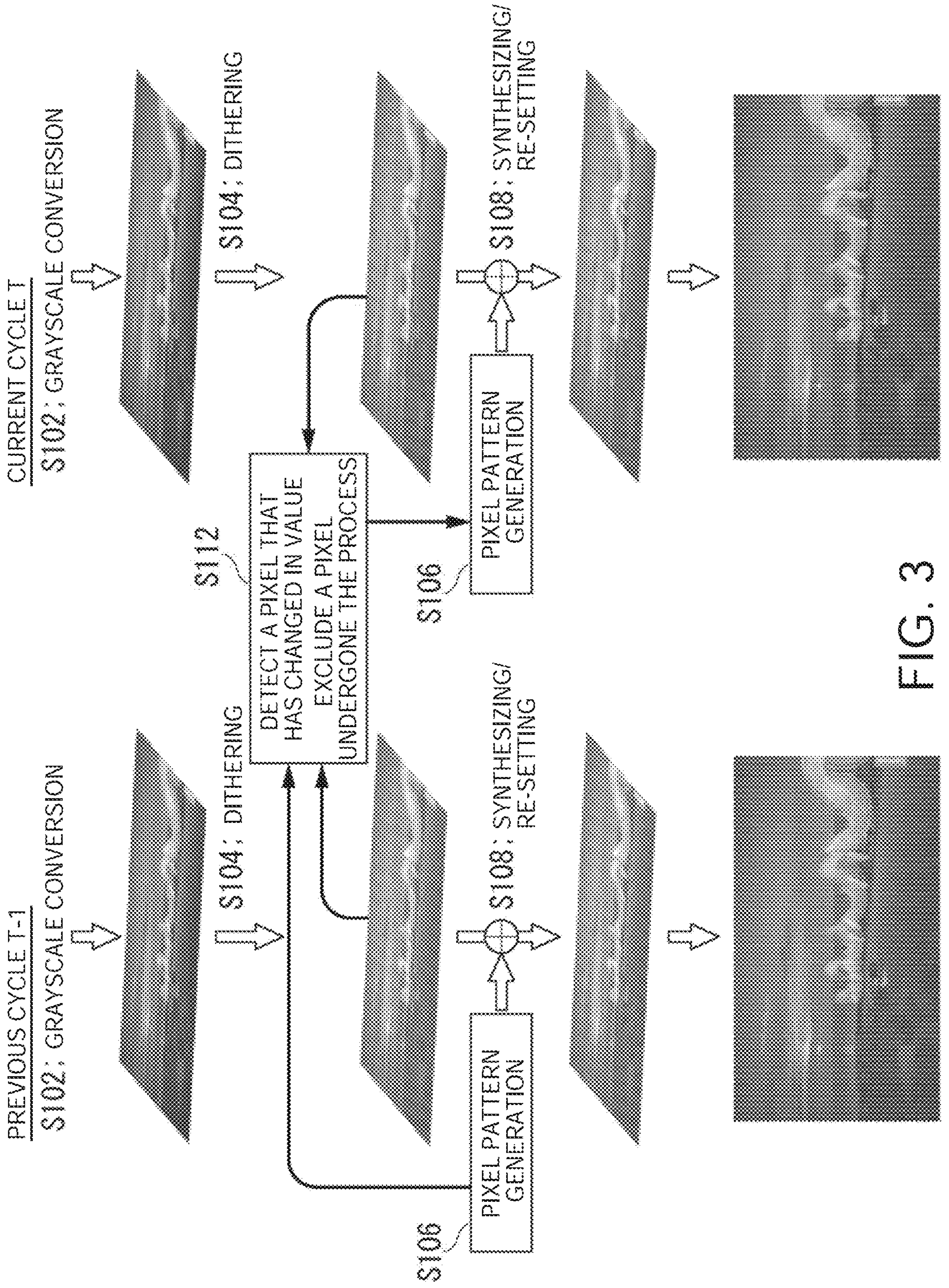
FIG. 3 is a flowchart illustrating another example of the display control according to one or more embodiments.

The process of FIG. 3 further includes the process of step S112 in addition to the process of steps S102 to S108 in each refresh cycle. The following mainly describes the process of step S112 in the current refresh cycle T. In each refresh cycle, the timing controller 36 stores the binary image generated in step S104 and the pixel pattern generated in step S106. After completing the process in step S106, the timing controller 36 proceeds to the process in step S112.

In step S112, the timing controller 36 compares the binary image generated in the current refresh cycle T with the binary image generated in the previous refresh cycle T-1, and detects pixels for which the value of the binary information constituting the binary image of the current refresh cycle T has changed from the value of the binary information constituting the binary image of the previous refresh cycle T-1. Then, the timing controller 36 includes the detected pixels as candidate pixels. The timing controller 36 excludes, from the candidate pixels, the target pixels that constitute the pixel pattern generated in the previous refresh cycle T-1, and stores the remaining candidate pixels.

In step S106, the timing controller 36 selects a target pixel from the saved candidate pixels according to the above-described procedure.

Figure 4:
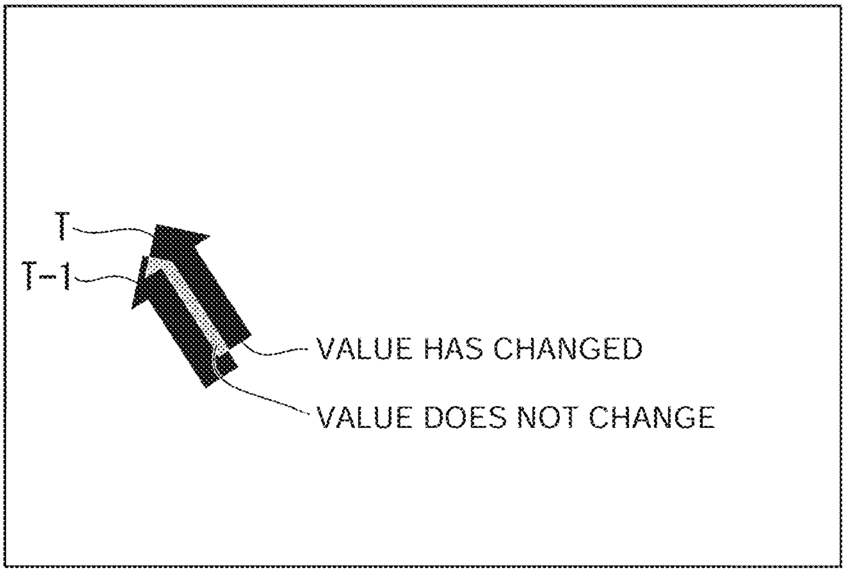
FIG. 4 describes an example of the time variation of the binary image.

FIG. 4 illustrates the time variation of the binary image. FIG. 4 illustrates the binary images at the previous refresh cycle T-1 and the current refresh cycle T. The binary images of these refresh cycles each represent an arrow pointing the upper left. The position of the arrow in the current refresh cycle T has moved toward the upper right from the position of the arrow in the previous refresh cycle T-1. Between the refresh cycles T-1 and T, their images have parts where the arrows overlap and parts where they do not. In FIG. 4, the area of one arrow that does not overlap with the other arrow has a darker color. In the pixels located in this area, the value of the binary information in the current refresh cycle T changes from the value of the binary information in the previous refresh cycle T-1. Therefore, these pixels can be included in candidate pixels. The parts where the arrows overlap each other are represented by shading. In the pixels located in this area, the value of the binary information does not change between the previous refresh cycle T-1 and the current refresh cycle T. Therefore, these pixels are excluded from the candidate pixels.

Figure 5:
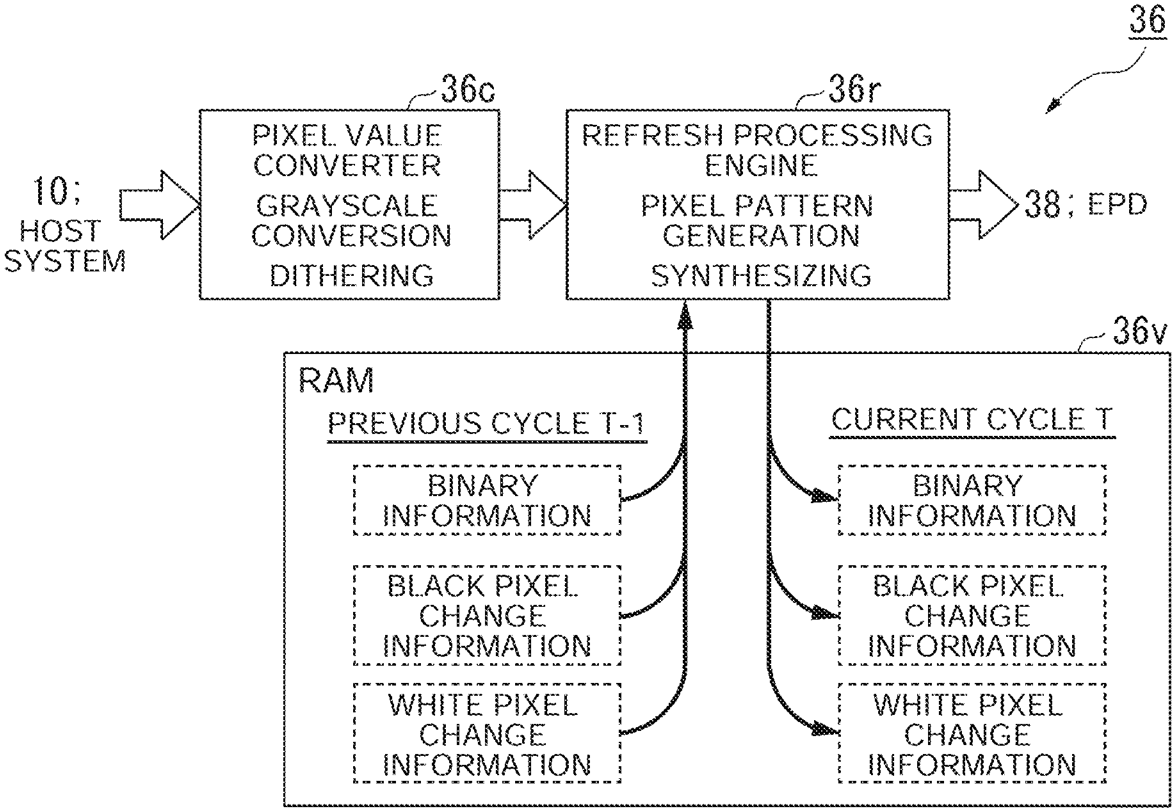
FIG. 5 is a schematic diagram of an example implementation of the timing controller according to one or more embodiments.

Next, the following describes an example implementation of the timing controller 36. FIG. 5 is a schematic diagram of an example implementation of the timing controller 36 according to one or more embodiments. The timing controller 36 includes a pixel value converter 36*c*, a refresh processing engine 36*r*, and a RAM 36*v*. The pixel value converter 36*c* and the refresh processing engine 36*r* may each be configured using dedicated hardware. The functions of the pixel value converter 36*c* and the refresh processing engine 36*r* may be logically implemented by using a processor and having it execute a predetermined program.

The pixel value converter 36*c* executes the processes of steps S102 and S104.

The pixel value converter 36*c* performs grayscale conversion to the RGB signal value for each pixel as display data input for each frame from the host system 10 and converts it to a grayscale value (step S102).

The pixel value converter 36*c* performs dithering to the grayscale value for each pixel to generate binary information indicating brightness and darkness (step S104). The pixel value converter 36*c* outputs binary information for each pixel to the refresh processing engine 36*r* and writes it in the frame buffer (not illustrated). The output image is transmitted to the EPD 38 using the written binary information.

The refresh processing engine 36*r* executes the processes of steps S112, S106, and S108. The refresh processing engine 36*r* may include a direct memory access controller (DMAC, not illustrated), and may control writing of data to and reading of data from the RAM 36*v*. The refresh processing engine 36*r* reads, from the RAM 36*v*, the binary information (B/W Frame data), black pixel change information (B-Dirty Pixel Data) and white pixel change information (W-Dirty Pixel Data) for each pixel for the previous refresh cycle. The black pixel change information indicates a pixel whose binary information has changed from a bright area to a dark area, that is, information indicating a pixel whose value has changed from 1 to 0. The white pixel change information indicates a pixel whose binary information has changed from a dark area to a bright area, that is, information indicating a pixel whose value has changed from 0 to 1.

The refresh processing engine 36*r* identifies the pixel for which a change has occurred in the value of the binary information of the current refresh cycle input from the pixel value converter 36*c* from the binary information of the previous refresh cycle read from the RAM 36*v*, and includes the identified pixel as a candidate pixel.

The refresh processing engine 36*r* identifies the pixels indicated in the black pixel change information and white pixel change information read from the RAM 36*v* as target pixels in the previous refresh cycle, and generates a set of candidate pixels as a pixel pattern, which are left after excluding the target pixels from the candidate pixels (step S112).

The refresh processing engine 36*r* selects target pixels from the set of candidate pixels specified by the pixel pattern at a predetermined refresh rate using a uniform random number (step S106). The refresh processing engine 36*r* may include a random number generator and generate the uniform random number.

The refresh processing engine 36*r* performs refresh process on the selected target pixels. In the refresh process, the refresh processing engine 36*r* inverts the value of the binary information (step S104). The refresh processing engine 36*r* writes the value-inverted binary information for each target pixel to the frame buffer. The variation of the drive voltage corresponding to the inversion of the value by the written binary information is transmitted to the corresponding target pixel of the EPD 38.

The refresh processing engine 36*r* identifies a target pixel whose binary information value has changed from 1 to 0 due to the refresh process, and records the information indicating the identified target pixel in the RAM 36*v* as black pixel change information for the current refresh cycle. The refresh processing engine 36*r* identifies a target pixel whose binary information value has changed from 0 to 1 due to the refresh process, and records the information indicating the identified target pixel in the RAM 36*v* as white pixel change information for the current refresh cycle.

The black pixel change information may be configured as a flag indicating whether or not each pixel has changed in its binary information value from 1 to 0. The white pixel change information may be configured as a flag indicating whether or not each pixel has changed in its binary information value from 0 to 1. In that case, the refresh processing engine 36*r* reads and writes 3 bits of data per pixel in one cycle of refresh process to and from the RAM 36*v*.

Figure 6:
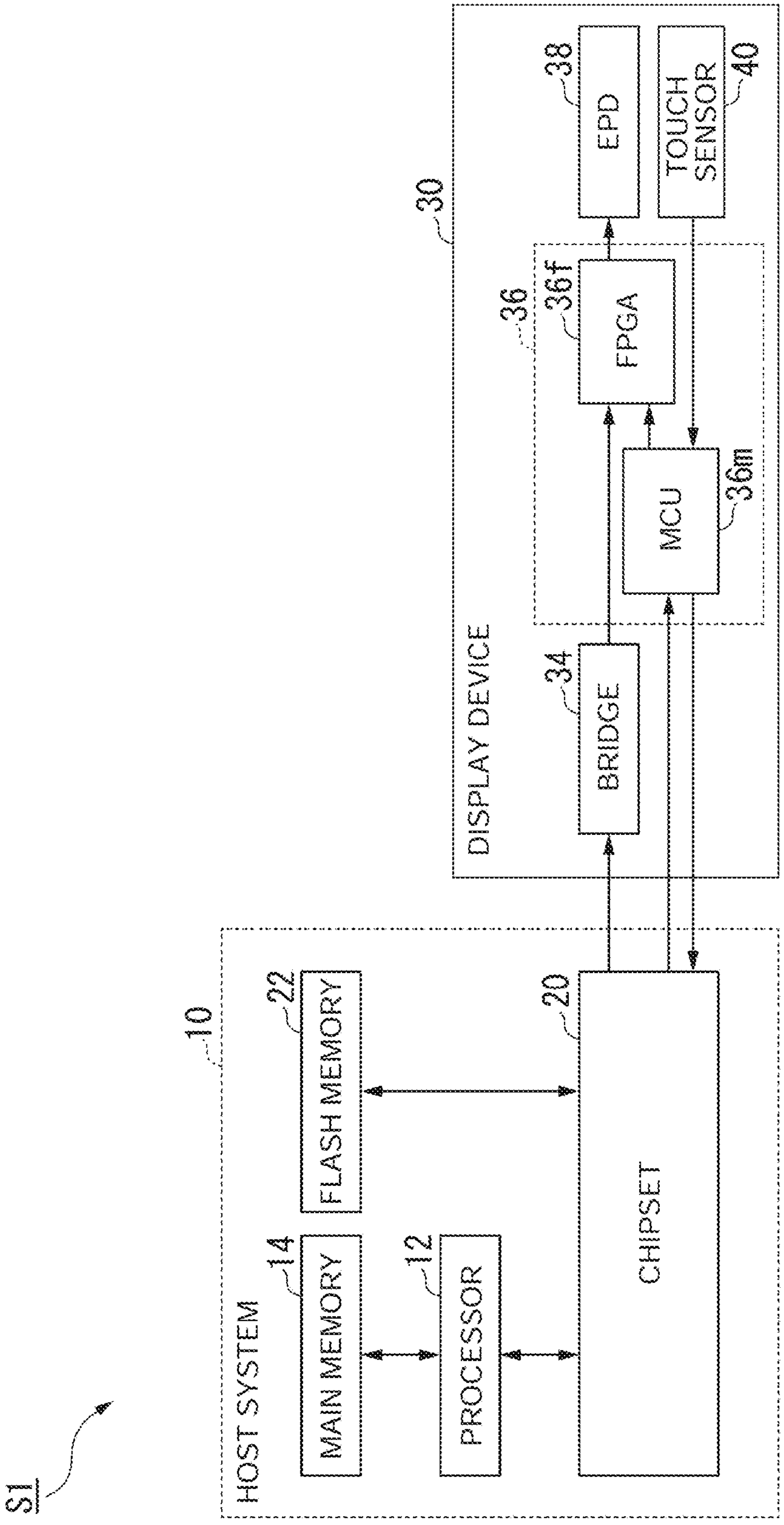
FIG. 6 is a block diagram schematically illustrating another example of the configuration of the information processing system according to one or more embodiments.

Next, the following describes another example of the configuration of the information processing system S1. FIG. 6 is a block diagram schematically illustrating another example of the configuration of the information processing system S1 according to one or more embodiments. In the example of FIG. 6, the timing controller 36 includes a micro controller unit (MCU) 36*m* and a field programmable gate array (FPGA) 36*f*.

Display data transmitted from the host system 10 according to the DP standard or the HDMI (registered trademark) standard is converted in format by the bridge 34 and input to the FGPA 36*f* according to the MIPI standard, as in the example of FIG. 1.

The MCU 36*m* converts the transmission protocol for display data input from the host system 10 from the protocol specified in the MIPI standard to the protocol specified in the SPI standard.

Display data transmitted from the host system 10 is input to the FGPA 36*f* according to the SPI standard.

The FGPA 36*f* causes the EPD to display the output image based on the display data input thereto.

The MCU 36*m* monitors a detection signal input from the touch sensor 40 according to the I2C standard and identifies the coordinates where the detection element that detected the input operation is located. The MCU 36*m* outputs input information indicating the identified coordinates to the host system 10 according to the USB standard.

For the FGPA 36*f*, input process is mainly performed to the display data, and process for acquiring input information based on the input operation can be omitted.

Figure 7:
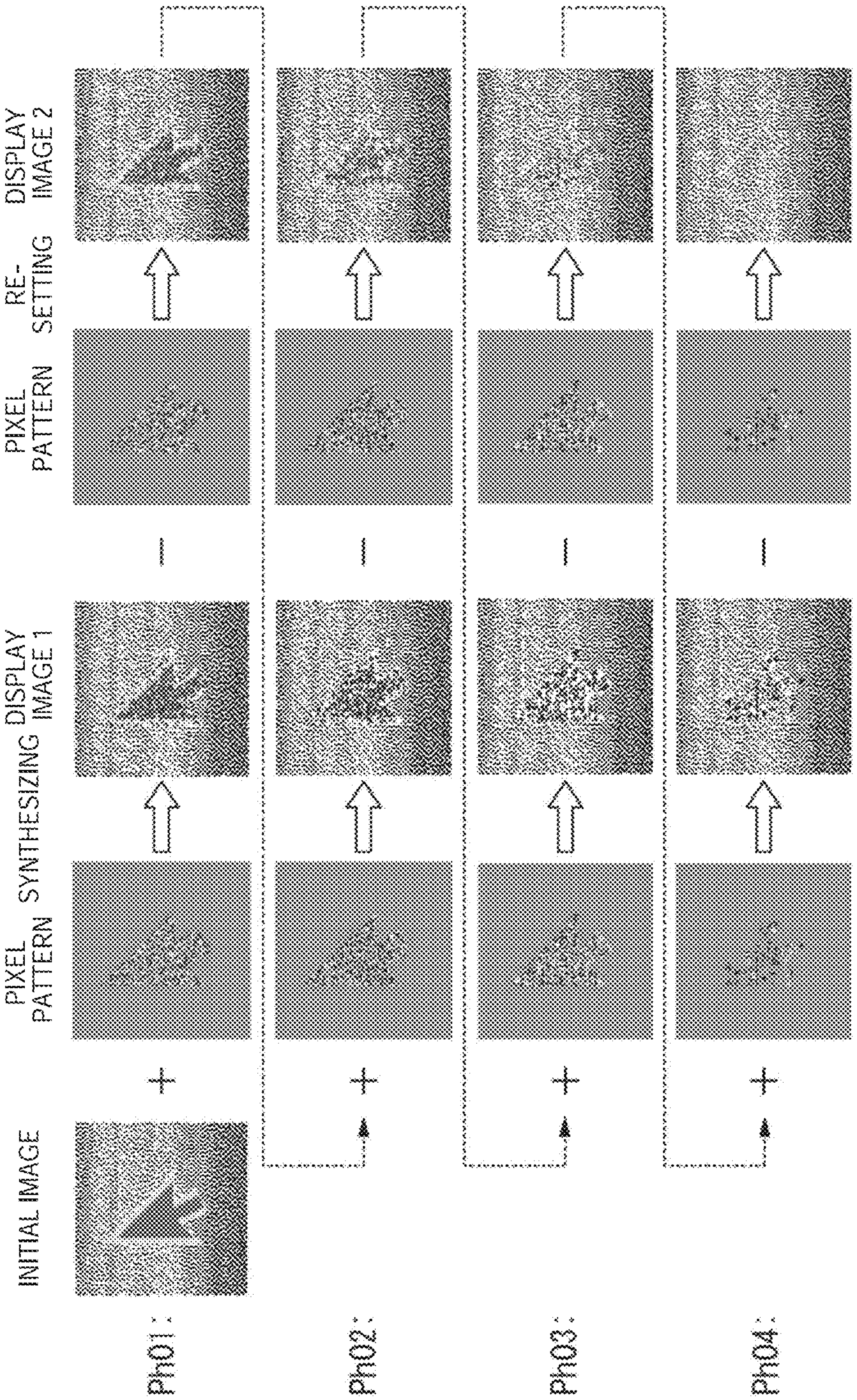
FIG. 7 describes an example of the execution of the refresh process according to one or more embodiments.

Next, the following describes an example of the execution of the refresh process according to one or more embodiments. FIG. 7 illustrates an example of the execution of the refresh process according to one or more embodiments. In the example of FIG. 7, after a binary image representing an arrow superimposed on the background image in the center is displayed on the EPD 38, the display image in which an arrow-shaped afterimage is displayed in the screen area is used as the initial image. It is assumed that the display of arrow is then stopped at a certain starting point in time, and the background image continues to be displayed as the output image. The arrow in the upper left direction is represented by a black fill in the center of the initial image. In the background image, shading is expressed macroscopically by the distribution of the density ratio of black pixels and white pixels.

In the example of FIG. 7, the refresh process is repeated a total of four times for each refresh cycle from the point at which the arrow display stops. The refresh rate at each stage of the refresh cycle is set at 0.25. With a refresh cycle of the four cycles, each pixel is refreshed an average of once. Each row of FIG. 7 illustrates a pixel pattern and display image 1, and pixel pattern and display image 2 at each refresh cycle in that order. The refresh process is executed for the screen area of the arrow, but not for the area around it. Candidate pixels are limited to the screen area of the arrow.

In the initial image, all pixels within the screen area of the arrow indicate a dark area, so the value of the binary information is 0. At the start of the first stage Ph01, the timing controller 36 inverts (synthesizes) the value of the binary information for the target pixels indicated by the pixel pattern in the background image to be the output image. Output image 1 (not illustrated) obtained by synthesizing pixel patterns is written into the frame buffer. In the display image 1 displayed on the EPD 38, the arrow remains as an afterimage. In the screen area of the arrow, the inversion of the value promotes the generation of a bright area.

After that, for the output image 1, the value of binary information indicated in the original output image is set (re-set) for the target pixels specified by the pixel pattern. The re-setting results in the original output image written to the frame buffer. For the display image 2 displayed on the EPD 38, the arrow remains as an afterimage, but restoration to a dark area is suppressed. After that, the process proceeds to the second stage Ph02.

The pixel pattern is synthesized and the output image is re-set repeatedly using a different pixel pattern at each stage, whereby the arrow afterimage in the display image is gradually eliminated. At the end of the fourth stage Ph04, the arrow afterimage is hardly visible in the display image 2.

Thus, the refresh process is performed for a different pixel pattern at each refresh cycle, and the target pixels to be processed are selected so that they are distributed at intervals wider than the intervals of the candidate pixels. This suppresses the impact of refresh process on visual perception.

When selecting target pixels from candidate pixels completely at random, some candidate pixels may not be selected as a target pixel through a plurality of refresh cycles. Then, the timing controller 36 may determine a pixel pattern for each candidate pixel so that each candidate pixel becomes a target pixel at least once in a unit cycle including multiple refresh cycles (e.g., 2 to 10 cycles). Specifically, the timing controller 36 may use uniform random numbers to determine, for each candidate pixel, in which cycle out of a plurality of refresh cycles making up a unit cycle the candidate pixel is to be selected as the target pixel The timing controller 36 does not necessarily have to sequentially generate a pixel pattern for each refresh cycle. The timing controller 36 may have a pre-set different pixel pattern for each refresh cycle, and may perform the refresh process to the target pixels specified by the pixel pattern corresponding to the refresh cycle among the set pixel patterns.

The arrangement of the target pixels making up a pixel pattern does not need to be irregular and may be regular. The target pixels may be pixels selected every plural rows or every plural columns from candidate pixels two-dimensionally placed in rows and columns (interlaced scanning). In that case, a different row or a different column out of the multiple rows or multiple columns may be used as the selection unit for each refresh cycle. For instance, the timing controller 36 repeats making the candidate pixels located in odd-numbered rows the target pixels in one refresh cycle and the candidate pixels located in even-numbered rows the target pixels in the next refresh cycle.

In one or more embodiments, the refresh cycle does not always have to be constant temporally or spatially. The timing controller 36 may increase the frequency of the refresh process for the more noticeable portion of the screen area that is affected by afterimage. Typically, the impact of afterimage is noticeable on the edge area and surrounding area within a predetermined range from the edge area. The edge area has a difference in signal value between adjacent pixels that is greater than a predetermined reference value. Any of a color signal value, a gray scale value, and binary information can be used as the signal value. Examples of the edge area include the outer edge of a cursor, a window, and another screen component, a line drawing, and a long and narrow spatially connected region in which the brightness or color tone rapidly changes spatially. In particular, when an edge area moves, the trajectory for movement in a direction that intersects its longitudinal direction tends to appear as an afterimage.

Thus, the timing controller 36 detects, as an edge area, the area where pixels having a difference in signal value from adjacent pixels that is larger than a predetermined reference value are connected, and identifies the area within a predetermined range from the detected edge area as a surrounding area. The timing controller 36 sets the frequency of the refresh cycle in the surrounding area higher than the standard refresh cycle frequency outside the surrounding area. The timing controller 36 performs the refresh process for target pixels according to the frequency set for these areas. The frequency of refresh process may be defined by a refresh cycle or a refresh rate, or may be defined by an update rate.

FIGS. 1 and 6 illustrate the touch sensor 40 that is integrated as an input device into the display device 30 and has a detection area that occupies a common area with the screen area, and the present application is not limited to this. The information processing system S1 may include an input device separate from the display device 30 instead of the touch sensor 40 or in addition to the touch sensor 40. Input devices are not limited to the touch sensor 40, but may be of any type, including a mouse, a keyboard, buttons, and dials. The input device may be omitted in the information processing system S1.

The display device 30 may be separate from the information processing apparatus including the host system 10, or may be configured to be detachable. The information processing system S1 may be connected to a display medium separate from the display device 30. Thus, the information processing system S1 may be wired or wirelessly connected to multiple sets of input and output. One input/output set has an input device and a display medium.

Here, if it is presumed that the user is concentrating on a display medium separate from the EPD 38 or on operating the corresponding input device, the host system 10 may set a higher frequency of refresh process by the timing controller 36 for the output image to the EPD 38 than a predetermined frequency reference value. This is because in this case, the user is unlikely to notice changes in brightness due to the refresh process.

For instance, the input frequency of input information acquired from the touch sensor 40 via the timing controller 36 is lower than a predetermined first reference frequency, and another input device has the input frequency of input information acquired that is higher than a predetermined second reference frequency. In this case, the host system 10 sets, for the timing controller 36, a refresh process frequency for the output image to the EPD 38 that is higher than a predetermined frequency reference value.

Conversely, when it is presumed that the user is concentrating on operations to the touch sensor 40, the host system 10 may set, for the timing controller 36, the frequency of refresh process for the output image to the EPD 38 to be lower than the predetermined frequency reference value. This is because in such a case, the user's operation will be hindered by changes in brightness of the displayed image on the EPD 38 due to the refresh process.

For instance, the input frequency of input information acquired from the touch sensor 40 via the timing controller 36 is higher than a predetermined first reference frequency, and no other input device has the input frequency of input information acquired that is higher than a predetermined second reference frequency. In this case, the host system 10 sets, for the timing controller 36, a refresh process frequency for the output image to the EPD 38 that is lower than a predetermined frequency reference value. At this time, the host system 10 may limit the area where the frequency of the refresh process is set lower than the predetermined frequency reference value to an area within a predetermined range from the coordinates specified by the input information.

The above describes an example in which display data representing a color image is input from the host system 10 and the timing controller 36 converts the color image into a monochrome binary image. The present application is not limited to this. The timing controller 36 may acquire display data representing a monochrome binary image from the host system 10. The timing controller 36 may acquire display data representing a monochrome grayscale image and perform binarization on the grayscale image to convert it to a binary image. In that case, the grayscale conversion for the color image is omitted.

The timing controller 36 may include a dedicated arithmetic circuit for performing grayscale conversion to a RGB signal and dithering to a binary image.

Referring to FIG. 2, the above describes an example in which the timing controller 36 performs both grayscale conversion and dithering, and the present application is not limited to this. The host system 10 may perform grayscale conversion and dithering. In that case, the timing controller 36 acquires a binary image from the host system 10, and can omit the process of steps S102 and S104 (FIG. 2). The host system 10 may further determine a pixel pattern for the binary image and perform the refresh process based on the determined pixel pattern. In that case, each time a binary image is obtained by inverting the value of the binary information for the target pixels through the refresh process, the host system 10 outputs the obtained binary image to the timing controller 36. The timing controller 36 stores the binary image input from the host system 10 in the frame buffer, and can omit the process in step S106 and in step S108.

Instead of the host system 10, the bridge 34 may perform grayscale conversion to a RGB signal input from the host system 10 and dithering to a binary image. In that case, the timing controller 36 acquires a binary image from the bridge 34 instead of from the host system 10, and can omit the process of steps S102 and S104 (FIG. 2). Instead of the host system 10, the bridge 34 may further determine a pixel pattern for the binary image and perform the refresh process based on the determined pixel pattern. In that case, the timing controller 36 stores the binary image input from the bridge 34 instead of from the host system 10 in the frame buffer, and can omit the process in step S106 and in step S108.

The EPD 38 may be configured as a color display capable of displaying color images. In that case, each pixel of the EPD 38 includes a set of subpixels. In each pixel, each subpixel has an electrophoretic element that represents a different color, and the intensity of the color component or whether or not to display it is indicated by a drive voltage. In this case, the timing controller 36 performs binarization for each color signal value representing a color image and converts it into a binary image for each color. In this case, grayscale conversion for color image is omitted. The timing controller 36 may perform the refresh process to a binary image for each color to obtain an output image and cause the EPD 38 to display the output image.

The above describes an example in which a binary image is displayed on the EPD 38 according to binary information for each pixel, and the present application is not limited to this. The timing controller 36 may cause the EPD 38 to display a multivalued image representing the density of each pixel according to the signal value (e.g., gray scale value or color signal value) of each pixel. In this case, the timing controller 36 may perform the refresh process of temporarily changing the signal value in the refresh cycle to an extremum. The extremum correspond to either the maximum value or the minimum value that determines the range of the signal value. The timing controller 36 uses TTL to apply a drive voltage corresponding to the signal value of each pixel to that pixel. Thus, the timing controller 36 applies the highest value of the driving voltage to the pixel that gives the maximum value, and applies the lowest value of the driving voltage to the pixel that gives the minimum value, thereby releasing the charge accumulated in the pixel to erase the afterimage.

As described above, the display device 30 in one or more embodiments has a display medium with a screen area in which pixels are placed at regular intervals, and a controller (e.g., timing controller 36) that causes the display medium to display an image. At every predetermined refresh cycle, the controller performs refresh process to pixels included in a different pixel pattern that are target pixels, and the target pixels are the pixels distributed at intervals wider than the intervals of the pixels placed in the screen area. The display medium may be the EPD 38. In one or more embodiments, the information processing system S1 may include a display device 30 and a host system 10 that provides a controller with display data representing a signal value for each pixel.

With this configuration, in each refresh cycle, refresh process is performed on target pixels that are distributed at intervals wider than the intervals of pixels in the screen area, and the target pixels are different for each refresh cycle. This mitigates a change in density of the target pixels due to the refresh process over the entire screen compared to the case where the refresh process is performed on all pixels at once. No operation is required to instruct the refresh process, and the visual impact of the refresh process is reduced, resulting in improved usability.

The controller may determine the target pixels from pixels (e.g., candidate pixels) placed in the screen area using pseudo random numbers.

With this configuration, the target pixels for the refresh process are determined irregularly for each refresh cycle. Target pixels are unpredictable, and thus the visual impact is reduced compared to the case where refresh processing is performed on regularly defined target pixels. This distributes the bias of the refresh process, which depends on the portions in the screen area.

The controller may acquire the binary information indicating the binarized signal value for each pixel at each refresh cycle, and determine the pixels for which the binary information in the current refresh cycle varies from the binary information in the previous refresh cycle as candidates for target pixels.

With this configuration, the controller selects a pixel in which a change in brightness occurs as a target pixel, and does not select a pixel in which no change in brightness occurs. This allows the refresh process to be concentrated on the pixels having a noticeable afterimage due to changes in brightness, and thus makes the process efficient.

The controller may exclude target pixels in the previous refresh cycle from the candidate pixels for the refresh process in the current refresh cycle.

With this configuration, the controller does not select a pixel that has undergone the latest refresh processing as a target pixel, and prompts refresh process for unprocessed pixels, whereby the process can be made more efficient.

The refresh process may include inverting the value of the binary information.

This configuration prevents the value of binary information, which can take only two values for each pixel, from being maintained for a long time.

The controller may detect an edge area where pixels having a difference in signal value from adjacent pixels that is larger than a predetermined reference value are connected, and may perform the refresh process to the pixels in the surrounding area within a predetermined range from the detected edge area more frequently than the pixels outside the surrounding area.

Afterimages tend to be easily recognized around the edge area where pixels with significant differences in density corresponding to signal values are connected. Thus, the controller performs the refresh process frequently to the surrounding area within a predetermined range from the edge area, which alleviates the visual impact of the afterimage.

The host system 10 may determine the frequency of the refresh process based on the frequency of input operations to the screen area.

The user tends to be interested in the part or situation where the input operation is performed. Therefore, the frequency of refresh process is lowered in the area or situation where input operations are more frequent, which suppresses the impact of refresh process on the operation.

The specific configuration of the present invention is not limited to the above-described embodiments, and also includes design modifications or the like within the scope of the present invention. The configurations described in the above embodiments can be combined freely.

DESCRIPTION OF SYMBOLS

S1 information processing system
10 host system
12 processor
14 main memory
20 chipset
22 flash memory
30 display device
34 bridge
36 timing controller
36*c* pixel value converter
36*f* FPGA
36*m* MCU
36*r* refresh processing engine
36*v* RAM
38 EPD
40 touch sensor

What is claimed is:

1. A display device comprising:
a display medium having a screen area in which pixels are disposed at regular intervals; and
a controller that causes the display medium to display an image,
the controller being configured to perform refresh the screen area by:
initializing a set of candidate pixels of the screen area;
determining a number of cycles to repeat a refresh process;
defining an update threshold based on the number of cycles;
executing the number of cycles, where each cycle includes:
assigning pseudo random numbers to the set of candidate pixels using a uniform random number distribution corresponding to a range of the update threshold;
obtaining a pixel pattern of target pixels for the current cycle based on a subset of the candidate pixels that have pseudo random numbers less than or equal to the update threshold;
resetting the target pixels; and
reducing the set of candidate pixels by removing the target corresponding to the pixel pattern for the current cycle,
the pixel pattern for each cycle is different based on reducing set of candidate pixels and different pseudo random numbers assigned each cycle, and
the target pixels for each cycle are distributed at intervals wider than the regular intervals.

2. The display device according to claim 1, wherein
each cycle of the refresh process includes inverting a binarized signal value of the target pixels.

3. The display device according to claim 1, wherein
the controller is configured to perform the refresh process more frequently to pixels in a surrounding area within a predetermined range from an edge area where pixels having a difference in signal value from adjacent pixels that is larger than a predetermined reference value are connected than to pixels outside the surrounding area.

4. The display device according to claim 1, wherein
the display medium includes an electro phoretic display.

5. An information processing system comprising:
a host system that provides the controller with display data indicating a signal value for each pixel; and
the display device according to claim 1.

6. The information processing system according to claim 5, wherein
the host system is configured to determine the frequency of the refresh process based on frequency of an input operation to the screen area.

7. A method for controlling a display device including a display medium having a screen area in which pixels are disposed at regular intervals, the method including:
causing the display medium to display an image,
refreshing the screen area by:
initializing a set of candidate pixels of the screen area;
determining a number of cycles to repeat a refresh process;
defining an update threshold based on the number of cycles;
executing the number of cycles, where each cycle includes:
assigning pseudo random numbers to the set of candidate pixels using a uniform random number distribution corresponding to a range of the update threshold;
obtaining a pixel pattern of target pixels for the current cycle based on a subset of the candidate pixels that have pseudo random numbers less than or equal to the update threshold;
resetting the target pixels; and
reducing the set of candidate pixels by removing the target corresponding to the pixel pattern for the current cycle, wherein
the pixel pattern for each cycle is different based on reducing set of candidate pixels and different pseudo random numbers assigned each cycle, and the target pixels for each cycle are distributed at intervals wider than the regular intervals.

* * * * *